US008320363B2

(12) United States Patent
Feng et al.

(10) Patent No.: US 8,320,363 B2
(45) Date of Patent: Nov. 27, 2012

(54) IMPLEMENTATION METHOD, SYSTEM AND DEVICE OF IMS INTERCEPTION

(75) Inventors: Yi Feng, Shenzhen (CN); Nengwu Yang, Shenzhen (CN); Hongda Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 472 days.

(21) Appl. No.: 12/628,416

(22) Filed: Dec. 1, 2009

(65) Prior Publication Data

US 2010/0135282 A1 Jun. 3, 2010

(30) Foreign Application Priority Data

Dec. 1, 2008 (CN) .......................... 2008 1 0180539
Jul. 22, 2009 (WO) ................ PCT/CN2009/072863

(51) Int. Cl.
*H04L 12/66* (2006.01)

(52) U.S. Cl. ...................................................... 370/352

(58) Field of Classification Search ........................ None
See application file for complete search history.

(56) References Cited

U.S. PATENT DOCUMENTS

| 2004/0157629 | A1* | 8/2004 | Kallio et al. | ................. | 455/466 |
| 2004/0228362 | A1* | 11/2004 | Maki et al. | ..................... | 370/467 |
| 2005/0152275 | A1* | 7/2005 | Laurila et al. | ................. | 370/241 |
| 2008/0275988 | A1* | 11/2008 | Zheng | ............................ | 709/224 |
| 2010/0039946 | A1* | 2/2010 | Imbimbo et al. | .............. | 370/252 |

FOREIGN PATENT DOCUMENTS

| CN | 1642115 A | 7/2005 |
| CN | 1870543 A | 11/2006 |
| CN | 101110719 A | 1/2008 |
| CN | 101141761 A | 3/2008 |
| CN | 101145979 A | 3/2008 |
| CN | 101150447 A | 3/2008 |
| CN | 101150448 A | 3/2008 |
| CN | 101222539 A | 7/2008 |
| CN | 101237660 A | 8/2008 |
| CN | 101247431 A | 8/2008 |
| CN | 101420432 A | 4/2009 |

OTHER PUBLICATIONS

Written Opinion of the International Searching Authority issued in corresponding PCT Patent Application No. PCT/CN2009/072863, mailed Oct. 22, 2009.

(Continued)

*Primary Examiner* — Yong Zhou
(74) *Attorney, Agent, or Firm* — Brinks Hofer Gilson & Lione (57) ABSTRACT

The embodiment of the present invention discloses an implementation method of IMS interception, a system and a device thereof. The method includes allocating media anchor points to communication parties; and copying communication content to complete interception of the communication content when the communication parties communicate through the media anchor points. In the present invention, the interception of the communication content can be implemented on the media anchor points instead of the existing media access equipment, thus implementing centralized interception of a media on an IMS network, and ensuring that users accessing the IMS network in various modes can implement the centralized interception of the media on an IMS core without requirement for access side equipment or an extended private interface between the IMS core and the access side equipment.

10 Claims, 4 Drawing Sheets

OTHER PUBLICATIONS

Office Action issued in corresponding Chinese Patent Application No. 200810180539.4, mailed Feb. 1, 2011.
ETSI, "Telecoms & Internet Converged Services & Protocols for Advanced Networks (TISPAN); NGN Lawful Interception; Lawful Interception Functional Entities, Information Flow and Reference Points", ETSI TS 187 005. V0.1.0, Draft, Sep. 2006.
ETSI, "Lawful Interception (LI); Interception Domain Architecture for IP Networks", ETSI TR 102 528. V1.1.1, Oct. 2006.
ETSI, "Telecommunications Security; Lawful Interception (LI); Handover Interface for the Lawful Interception of Telecommunications Traffic", ETSI ES 201 671. V2.1.1, Sep. 2001.
ETSI, "Lawful Interception (LI); Handover Interface for the Lawful Interception of Telecommunications Traffic", ETSI TS 101 671. V2.13.1, Jan. 2006.
3GPP, "3rd Generation Partnership Project; Technical Specification Group Services and System Aspect; 3G Security; Lawful Interception Requirements", 3GPP TS 33.106. V.10.0.0, Jun. 2010.
3GPP, "3rd Generation Partnership Project; Technical Specification Group Services and System Aspects; 3G Security; Lawful Interception Architecture and Functions" Release 10, 3GPP TS 33.107. V10. 3.0, Mar. 2011.
3GPP, "3rd Generation Partnership Project; Technical Specification Group Services and System Aspects; 3G Security; Handover Interface for Lawful Interception (LI)" Release 10), 3GPP TS 33.108. V10.3.0, Mar. 2011.
Etsi, "Lawful Interception (LI); Handover Interface and Service-Specific Details (SSD) for IP delivery; Part 5: Service-Specific Details for IP Multimedia Services", ETSI TS 102 232-5. V2.2.1, Nov. 2007.

* cited by examiner

IMPLEMENTATION METHOD, SYSTEM AND DEVICE OF IMS INTERCEPTION

CROSS-REFERENCE TO RELATED APPLICATION

This application claims priority to Chinese Patent Application No. 200810180539.4, filed on Dec. 1, 2008, and International Application No. PCT/CN2009/072863, filed on Jul. 22, 2009. The contents of the above identified applications are incorporated by reference herein in their entireties.

FIELD OF THE TECHNOLOGY

The disclosure relates to the communication technology field, and more particularly to an implementation method, an implementation system and an implementation device of IMS interception.

BACKGROUND

An IP multimedia subsystem (IMS) takes a packet switched domain as an upper control signaling and a media transmission bearer channel and takes a session initial protocol (SIP) as a service control protocol to separate service control from bearer control so as to provide diversified multimedia services. An IMS network is a target network of a telecommunication core network, plays an important role in the telecommunication network, has an integration capability of converging multiple mobile and fixed access networks conveniently, and wins support from more and more telecommunication equipment manufacturers and operators.

Lawful interception means that a national security organization sets a specific intercepted object on communication equipment under the authorization of laws, and sends session event information and communication content of the specific intercepted object to an interception center designated by the security organization through a specific interface. The interception center can recover a communication event and the communication content of the intercepted object according to the information to achieve the interception purpose. The lawful interception should be also implemented in an IMS network, and IMS interception refers to anchoring a media stream of an intercepted session to a media-level net element controlled by an IMS core through a core network and intercepting the media stream of the intercepted session.

In the existing technology, a proxy-call session control function (P-CSCF) controls an access-border gateway function (A-BGF) to copy the media stream by determining a session interception mode on a call session control function (CSCF) so as to copy the communication content of the session, that is, interception of an IMS user is implemented on the A-BGF. When the P-CSCF obtains IP multimedia public identity (IMPU) information about the user which is accessed to an IMS domain through the P-CSCF, the P-CSCF judges whether the session is required to be intercepted according to the IMPU information. When the user is required to be intercepted, the P-CSCF controls the A-BGF to copy the media stream of the session to an law enforcement monitoring facility (LEMF) by a Gq' interface between the P-CSCF and an service policy decision function (SPDF) and an Ia interface between the SPDF and the A-BGF, and the LEMF is adapted to set, maintain and control all interception events.

During implementation of the embodiment of the present invention, inventors find that the existing technology at least has the following problems:

In the existing technology, the interception process is implemented in need of the interface between the P-CSCF and the SPDF and the interface between the SPDF and the A-BGF, but the interfaces have no unified standard and are difficult for joint.

SUMMARY

The embodiment of the present invention provides an implementation method, an implementation system and an implementation device of IMS interception to intercept a terminal user in an IMS system.

In order to achieve the purpose, the embodiment of the present invention provides an implementation method of IP multimedia subsystem (IMS) interception, and the method includes:

Media anchor points are allocated to communication parties.

Communication content is copied to complete interception of the communication content when the communication parties communicate through the media anchor points.

The embodiment of the present invention further provides an implementation system of IP multimedia subsystem (IMS) interception, and the system includes a content of communication trigger function (CCTF) and a content of communication internal interception function (CC-IIF).

The CCTF is adapted to control the CC-IIF to allocate media anchor points to communication parties and control the CC-IIF to copy communication content to complete interception of the communication content when the communication parties communicate through the media anchor points.

The CC-IIF is adapted to allocate the media anchor points to the communication parties and copy the communication content when the communication parties communicate through the media anchor points.

The embodiment of the present invention further provides an implementation device of IP multimedia subsystem (IMS) interception, and the device includes a first control module and a second control module.

The first control module is adapted to control a content of communication internal interception function (CC-IIF) to allocate media anchor points to communication parties.

The second control module is adapted to control the CC-IIF to copy communication content when the communication parties communicate through the media anchor points to complete IMS interception of the communication content.

The embodiment of the present invention further provides an implementation device of IP multimedia subsystem (IMS) interception, and the device includes an allocation module and a copying module.

The allocation module is adapted to allocate media anchor points to communication parties.

The copying module is adapted to copy communication content to complete IMS interception of the communication content when the communication parties communicate through the media anchor points.

Compared with the existing technology, the embodiment of the present invention has the following advantages:

The interception of the communication content can be implemented on the media anchor point instead of the existing media access equipment, thus implementing centralized interception of a media on an IMS network, and ensuring that users accessing the IMS network in various modes can implement the centralized interception of the media on an IMS core without requirement for access side equipment or an extended private interface between the IMS core and the access side equipment. Moreover, the centralized interception of the media is implemented by anchoring the media to the IMS core, which can ensure signaling and media of all intercepted calls to pass through the CCTF and the CC-IIF respectively, and implement the interception of a supplementary service on the IMS core and the interception of a roaming user in a home network.

BRIEF DESCRIPTION OF THE DRAWINGS

In order to describe the embodiment of the present invention or the technical scheme of the existing technology more specifically, accompanying drawings referenced in descriptions of the embodiment or the existing technology are briefly introduced as follows. Apparently, the accompanying drawings in the following descriptions are only certain embodiments of the present invention, and to those skilled in the art, other accompanying drawings can be obtained according to the accompanying drawings without creative work.

DETAILED DESCRIPTION

The technical scheme in the embodiments of the present invention is described clearly and fully by reference to the accompany drawings of the embodiments of the present invention, and apparently, the described embodiments are just part of the embodiments of the present invention, but not all of the embodiments. On the basis of the embodiments of the present invention, all other embodiments obtained by those skilled in the art without creative work are merged in the protection scope of the present invention.

Figure 1:
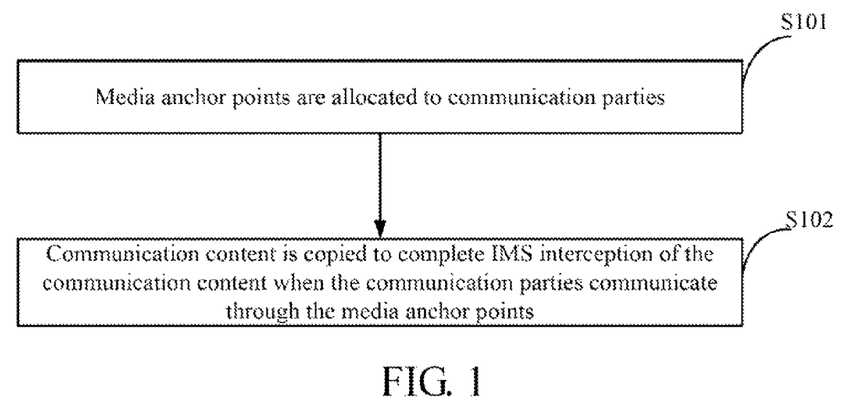
FIG. 1 is a flow diagram of an implementation method of IMS interception provided in the first embodiment of the present invention.

An implementation method of IMS interception provided in the first embodiment of the present invention is shown in FIG. 1, and the method includes:

Block S101, media anchor points are allocated to communication parties.

Block S102, communication content to complete IMS interception of the communication content when the communication parties communicate through the media anchor points.

More specifically, in the embodiment, the communication parties relate to two or more parties to communication, and in all embodiments of the present invention, the communication parties are construed by setting two parties to the communication as an example.

The allocating media anchor points to communication parties includes controlling a content of communication internal interception function (CC-IIF) to allocate the media anchor points to the communication parties; and the copying communication content includes controlling the CC-IIF to copy the communication content.

Before allocating media anchor points to communication parties, the method further includes receiving media information of the communication parties which is required to be intercepted and the media information is sent via a media anchor request message from an IMS net element. After allocating media anchor points to communication parties, the method further includes sending a result of the media anchor points allocated to the communication parties to the IMS net element via a media anchor result response message. The IMS net element includes, but is not limited to an S-CSCF, an AS, an MGCF, an IBCF or a P-CSCF. The media anchor request message includes, but is not limited to a session-relative SIP message or a session-irrelative message; and the anchor result response message includes, but is not limited to a session-relative SIP message or a session-irrelative message. The session-irrelative message includes, but is not limited to a session-irrelative SIP message or a session-irrelative non-SIP message; the session-irrelative SIP message includes, but is not limited to an INFO message or a MESSAGE message and a corresponding response message; and the session-irrelative non-SIP message includes, but is not limited to a Diameter protocol message. The session-relative SIP message includes, but is not limited to an SIP session message as the media anchor request message which is directly sent to a CCTF.

Moreover, the communication content includes, but is not limited to voice communication content, fax content, MODEM content, video communication content or data interaction content. After copying communication content, the method further includes sending the communication content to an interception center by the CC-IIF; and the sending the communication content to the interception center includes, but is not limited to: sending the communication content to the interception center in a manner of copying the communication content on a connecting circuit through a narrow band TDM circuit connection; sending the communication content to the interception center in a manner of initiating a narrow band call to the interception center through a narrow band TDM circuit connection; sending the communication content to the interception center in a manner of copying the communication content on an IP connection through the IP connection; or sending the communication content to the interception center in a manner of initiating a call on an IP connection through the IP connection.

Obviously, in the embodiment, the interception of the communication content can be implemented on the media anchor points instead of the existing media access equipment, thus implementing centralized interception of a media on the IMS network, and ensuring that users accessing the IMS network in various modes can implement the centralization interception of the media on an IMS core without requirement for access side equipment or an extended private interface between the IMS core and the access side equipment.

Furthermore, the CCTF module and the CC-IIF module are added to the IMS core, thus implementing the centralized interception of the media on the IMS network and ensuring that users accessing the IMS network in various modes can implement the centralized interception of the media on the IMS core. In addition, the added CCTF module and the added CC-IIF module adapted to implement media stream interception are core network components and are limited in the IMS core, which does not need the extended private interface between the IMS core and the access side equipment.

Meanwhile, signaling and media of an interception call pass through the CCTF module and the CC-IIF module respectively, which can ensure to implement the interception of a roaming user in a home network and the interception of various supplementary services.

An implementation method of EMS interception provided in the second embodiment of the present invention is implemented by an IMS network architecture which includes a CSCF, a home subscriber server (HSS), a server application (AS), a multimedia resource control function (MRFC) and a policy decision function (PDF). The CSCF is adapted to control login and sessions of users, the HSS is adapted to manage user profile data in a centralized way, and the AS is adapted to provide various service logic control functions. The CSCF is divided into a proxy-CSCF (P-CSCF), an interrogating-CSCF (I-CSCF) and a serving-CSCF (S-CSCF). The P-CSCF, I-CSCF and S-CSCF can be combined physically to form a functional module and can also be separated as different functional modules respectively. The user accesses the IMS network through the P-CSCF of a home network. The S-CSCF of the home network completes trigger control of a session and a service, and service control interaction with the AS; and the I-CSCF is adapted to interrogate routing. The P-CSCF is an entry for user equipment (UE) to access to an IMS system, and the S-CSCF takes charge of login authentication and session control of the UE in an IMS core network, execute a basic session routing function for a calling terminal IMS user and a called terminal IMS user, and when conditions are satisfied, performs value added service trigger and the service control interaction of the AS according to an IMS trigger rule which is subscribed by the user.

The IMS network architecture includes an access interconnection layer, a session control layer and an application layer. The access interconnection layer can complete initiation and termination of SIP sessions of various SIP terminals, implement IP packets, perform switching of bearer types, implement a quality of service (QoS) policy according to service deployment and control of the session layer, and complete interconnection and intercommunication with a public service telecommunication network (PSTN)/public land mobile network (PLMN). The access interconnection layer includes, but is not limited to equipments such as various SIP terminals, wired access, wireless access, interconnection or intercommunication gateway, etc. The session layer can complete basic session control, user login and SIP session routing control, execute the functions of sessions in application services, maintaining and managing user data, managing the service QoS policy, and etc. interactively with the AS, and provide the same service environment for all users together with the application layer.

Figure 2:
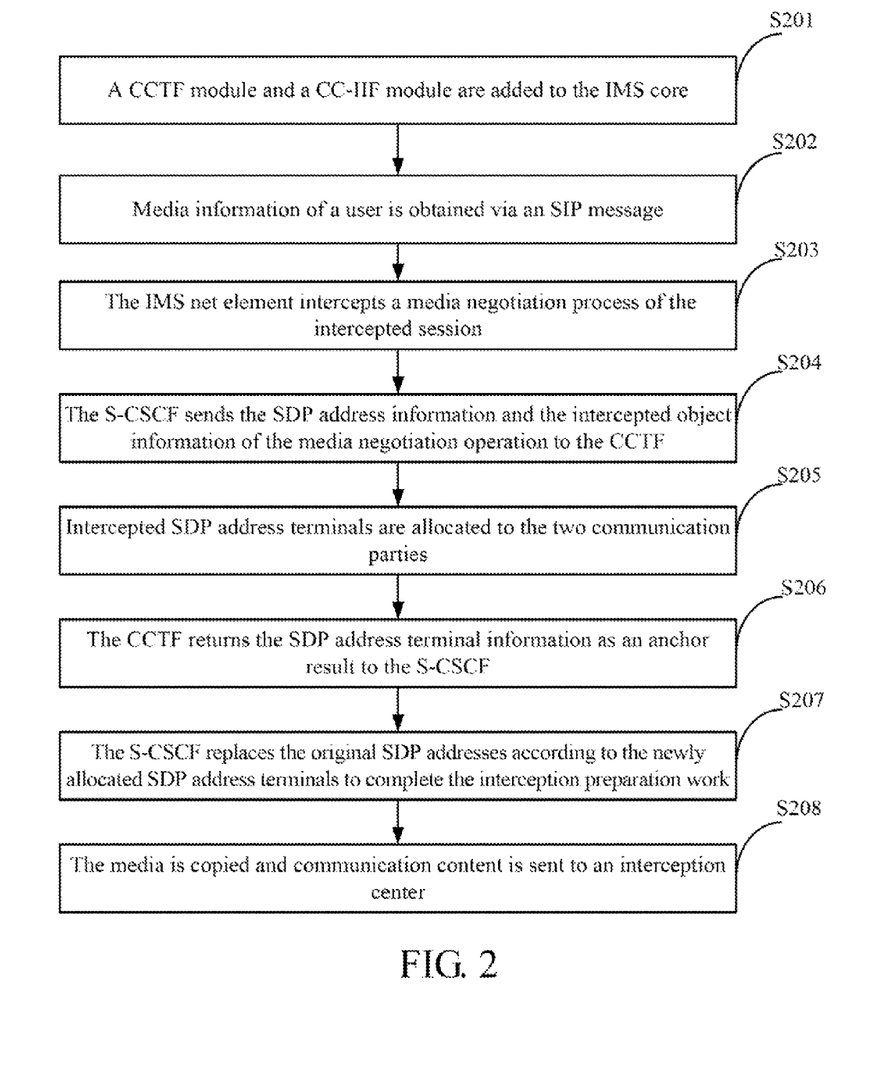
FIG. 2 is a flow diagram of an implementation method of IMS interception provided in the second embodiment of the present invention.

In the IMS system, the SIP is a basic protocol of the IMS, an ongoing protocol under continuous research, a framework protocol of a multimedia communication system, and an application layer protocol which can help complete a multimedia session process based on text encoding, is adapted to establish, change or end the multimedia session, and can cooperate with a multimedia stream protocol to jointly complete session establishment and media negotiation in the IMS network. The implementation method of IMS interception is as shown in FIG. 2 and the method includes:

Block S201, a content of communication trigger function (CCTF) module and a content of communication internal interception function (CC-IIF) module are added to the IMS core.

More specifically, the CCTF module implements a signaling control function of centralized interception of the media on the IMS core, and the CC-IIF module implements a media copying function of the centralized interception of the media on the IMS core. The CCTF can anchor the media of the intercepted call to the CC-IIF of the IMS core, and the CC-IIF can copy a media stream of the intercepted call to a lawful interception gateway (LIG).

Block S202, a session between two session parties is initialized before establishing the session in the IMS system, that is, media information of a user is obtained via an SIP message. The media information includes, but is not limited to session description protocol (SDP) address information and intercepted object information.

Block S203, an intercepted object is set to an IMS net element, and the IMS net element determines the present session is required to be intercepted when a session request is routed to the IMS net element of the home network of the intercepted object, and intercepts a media negotiation process of the intercepted session.

More specifically, the IMS net element includes, but is not limited to the S-CSCF, P-CSCF, AS or a media gateway control function (MGCF). In the embodiment, the S-CSCF is construed by setting the IMS net element as an example.

Block S204, the S-CSCF sends the SDP address information and the intercepted object information of the media negotiation operation to the CCTF.

More specifically, the obtained SDP address information and the obtained intercepted object information will pass through the S-CSCF of a user home domain while initializing, and the S-CSCF sends the SDP address information and the intercepted object information to the CCTF via a media anchor request message when the SDP address information and the intercepted object information pass through the S-CSCF. The media anchor request message includes, but is not limited to a session-relative SIP message or a session-irrelative message. The session-relative SIP message includes, but is not limited to an Invite message, a reinvite message, an 18x message or a 2xx message in the call. The session-irrelative message includes, but is not limited to a session-irrelative SIP INFO message or a session-irrelative SIP MESSAGE message. The session-irrelative INFO message or MESSAGE message is an SIP message based on the SIP protocol. The session-irrelative message can also be a session-irrelative non-SIP message. The session-irrelative non-SIP message includes, but is not limited to a Diameter message, for example, an AA-request (AAR) message of Diameter (AAA protocol standard of a next generation) or an AA-answer (AAA) message of the Diameter, as well as messages with the contents of SDP information, user information necessary for interception, operation indication information, and etc. which are implemented by a Diameter extension attribute-length-value (AVP), that is, an attribute value in a basic protocol of the Diameter. The SDP address information is the address information of communication parties which communicate via the SDP address information. The intercepted object information includes, but is not limited to the user information necessary for interception, the operation indication information and the address information of the communication parties. The SDP address information and the intercepted object information can be stored in an extension header domain of the INFO or MESSAGE message or be packed into an extensible markup language (XML) format and then be filled into an SIP body (internal). The CCTF is a functional module for the IMS network to implement the media interception, can be an independent net element, and also can be jointly stored on the media gateway control function (MGCF) or the S-CSCF. In the embodiment, the session-irrelative message is a message which is not limited by an INVITE request and a response path. For example, a dialog is established between the INVITE request and a corresponding 200 response (or 101-199 temporary response) with a To-Tag, and the dialog is a terminal-to-terminal SIP relation between two users and lasts a certain period of time. When an in-session message is used, the in-session message is required to be transmitted in a path which is established between the INVITE request and the corresponding 200 response with the To-Tag. A routing path of the SIP request and the response in the dialog can be limited by the dialog, and the dialog is followed by a rule carried in a header domain of the in-session message. However, the session-irrelative message is not limited by the path and the rule carried in the header domain. In the embodiment, the SDP address information of two communication parties can be anchored to the CCTF from any S-CSCF on the path established between the INVITE request and the corresponding 200 response with the To-Tag via the session-irrelative message.

Block S205, intercepted SDP address terminals are allocated to the two communication parties.

More specifically, an SDP media format of the allocated SDP address terminals is the same as that of the SDP address information sent by the S-CSCF. A main body allocating the intercepted SDP address terminals to the two communication parties can be that the CCTF allocates the intercepted SDP address terminals to the two communication parties, or the CCTF controls the CC-IIF to allocate the intercepted SDP address terminals to the two communication parties. In the embodiment, an example is that the CCTF controls the CC-IIF to allocate the intercepted SDP address terminals to the two communication parties.

Block S206, the CCTF returns the SDP address terminal information as an anchor result to the S-CSCF.

Block S207, the S-CSCF replaces the original SDP addresses according to the newly allocated SDP address terminals to complete the interception preparation work.

More specifically, the SDP address terminals are the terminal information used during interaction between the CCTF and the two communication parties. For example, suppose that there is a first user and a second user, and provided that the SDP terminal of the first user is A and the SDP terminal of the second user is B. In an initialization stage, the SDP address information of the first user (the address information terminal A) can be informed of the second user by the IMS net element, and the SDP address information of the second user (the address information terminal B) can be informed of the first user. When the first user and the second user make a session, the first user and the second user directly make the session according to the SDP information of the two parties, that is, the original SDP addresses. When the session between the first user and the second user is required to be intercepted, in the initialization stage, the SDP address information of the first user is informed of the CCTF by the IMS net element via the media anchor request message, and the CCTF controls the CC-IIF to allocate the SDP address terminal to the first user, that is, the SDP address information (the address information terminal C) adapted to communicate with the first user is allocated to the first user. Similarly, the CCTF also needs to control the CC-IIF to allocate the SDP address terminal to the second user, that is, the SDP address information (the address information terminal D) adapted to communicate with the second user is allocated to the second user. Meanwhile, the CC-IIF also needs to establish a communication connection between the terminal C and the terminal D. When the first user and the second user make a session, the terminal A of the first user exchanges a voice (or data) packet with the terminal C according to the SDP address information, and the terminal B of the second user exchanges the voice (or data) packet with the terminal D according to the SDP address information. A communication connection is established between the terminal C and the terminal D, that is, the session is established between the first user and the second user, i.e., the newly allocated SDP address terminal replaces the original SDP address, thus completing the interception preparation work.

Block S208, after the session is established successfully in the IMS network, exchanging the voice (or data) packet of the session between the two communication parties need to pass through the SDP address terminals allocated by the CCTF. At that time, the media is copied and communication content is sent to an interception center. The main body copying the media can be that the CCTF copies the media, or the CCTF controls the CC-IIF to copy the media. In the embodiment, an example is that the CCTF controls the CC-IIF to copy the media.

More specifically, the SDP address information of the session through the media negotiation operation of the S-CSCF is replaced with the SDP address information of a media terminal applied on the CC-IIF. A calling user can regard the CC-IIF as a called user of the present session, and the called user can regard the CC-IIF as the calling user of the present session. When the media negotiation is completed and the media stream establishment starts, all session media streams are established by the CC-IIF. At that time, the CCTF controls the CC-IIF to implement succession of the calling media stream and the called media stream, and copy the media streams to the LIG or the LEMF, thus implementing interception of the media streams. The mode of copying the media stream to the LIG or the LEMF can be different according to the requirements of the interception center, and more specifically includes, but is not limited to: sending the communication content to the interception center in a manner of directly copying the communication content on a connecting circuit through a narrow band circuit connection; sending the communication content to the interception center in a manner of initiating a narrow band call to the interception center through a narrow band circuit connection; sending the communication content to the interception center in a manner of directly copying the communication content on an IP connection through the IP connection; or sending the communication content to the interception center in a manner of initiating an SIP call on an IP connection through the IP connection.

In the process of the session, if the media is updated during the session, for example, the media is switched from a session process to a fax process, the CCTF just needs to control an interception gateway to change the original communication address information of the two parties into the address information of fax, then the S-CSCF can continue anchoring the media negotiation to the CCTF via the media anchor request message, and the CCTF controls the CC-IIF to copy the media. In the embodiment of the present invention, the interception method is applicable to the interception of the session, and to the interception of various communication contents such as fax content, MODEM content, video communication content, data interaction content, etc. according to the interception method. As long as the communication between the users is exchanged by the negotiated media in the IMS domain, the communication can be intercepted by the method of the embodiment.

In the existing technology, call signaling and the media stream do not pass through the P-CSCF and the A-BGF to which the called user is originally positioned when the supplementary service occurs in the IMS core, therefore, the interception of the supplementary service can not be implemented by controlling the A-BGF to copy the media using the P-CSCF to which the intercepted user belongs. The interception method provided by the embodiment of the present invention is also applicable to the interception of various supplementary services. For example, a service party can subscribe to a call forwarding unconditional (CFU) service in CFU interception service, and the second party subscribes to the CFU service named a call forwarding to a third party. The first calling party calls the second service party, then the S-CSCF of the second service party can trigger the call to the AS of the second service party. The AS initiates a new SIP call to the third party, and the third party receives the call from the first party. The second party does not take part in the communication, and the communication is performed between the first party and the third party finally. If the second service party is intercepted, the S-CSCF of the second party initiates anchoring to the CCTF before triggering the call to the AS, and the AS does not initiate the anchoring any more on the path adapted to initiate the call to the third party. Then, all SDP interactions can pass through the CCTF, and the CCTF controls the CC-IIF to allocate the SDP address terminals to the two parties respectively. As the process that the CCTF controls the CC-IIF to allocate the SDP address terminals to the two parties respectively is the same as the process of allocating the SDP address terminals in the block S204, the process is not repeated any more. Voice (or data) interactions between the two communication parties can pass through the SDP address terminals on the CCTF after the session is established successfully, and the CCTF can control the interception gateway to copy the media and send the communication content to the interception center. The supplementary services include, but are not limited to the CFU, call forwarding on busy, call forwarding on no reply, call waiting, conference call adding or call transfer.

Obviously, in the embodiment, the interception of the communication content can be implemented on the media anchor point instead of the existing media access equipment, thus implementing centralized interception of the media on the IMS network. Furthermore, the CCTF module and the CC-IIF module are added to the IMS core, thus implementing the centralized interception of the media on the IMS network and ensuring that users accessing the IMS network in various modes can implement the centralized interception of the media on the IMS core. In addition, the added CCTF module and the added CC-IIF module adapted to implement media stream interception are core network components and belong to the associated components of the IMS core adapted to implement lawful interception, thus ensuring that the adopted private interface is only located in the IMS core, which does not need the extended private interface between the IMS core and the access side equipment. Furthermore, the interception of the supplementary services can also be implemented.

Figure 3:
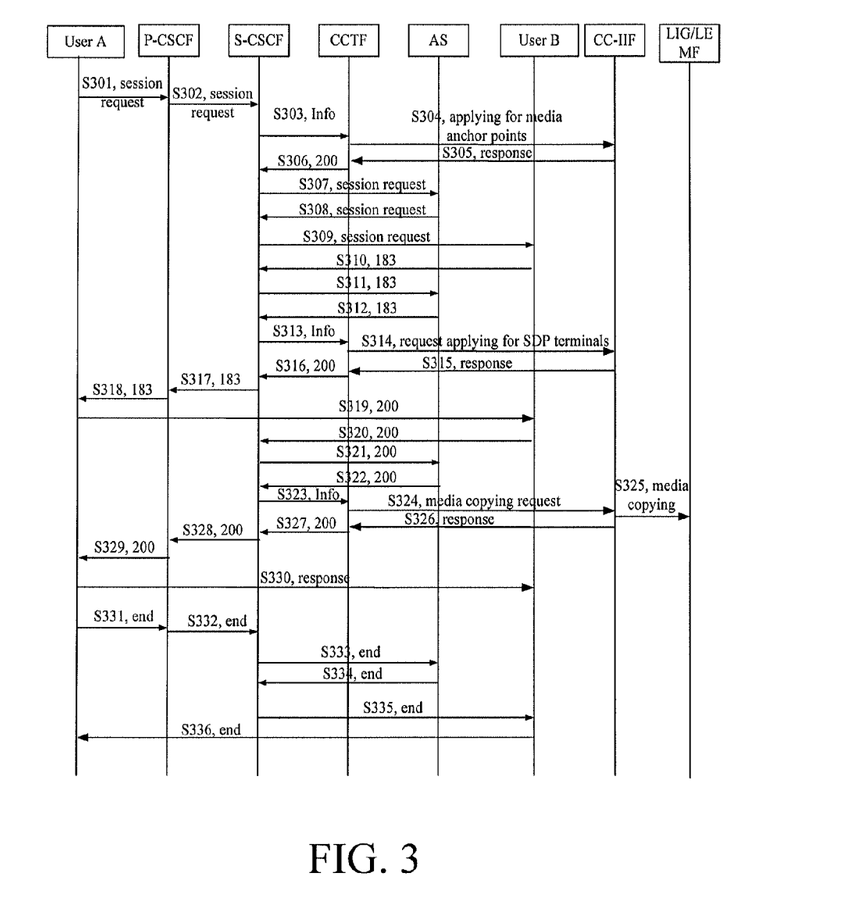
FIG. 3 is a flow diagram of an implementation method of IMS interception provided in the third embodiment of the present invention.

The third embodiment of the present invention provides an implementation method of IMS interception. In the embodiment, a calling user A is taken as an intercepted object, and SDP information is exchanged via an out-session Info message between an S-CSCF and a CCTF. In the embodiment, the S-CSCF and a P-CSCF are those of the home of user A. That the CCTF and a CC-IIF uses an H.248 message is taken as an example to explain the interception flow of a basic call. The implementation method is as shown in FIG. 3 and includes:

Block S301, the user A sends a session request message to the P-CSCF to which the user A belongs, and the message carries the SDP address information of the user A.

Block S302, the P-CSCF to which the user A belongs forwards the session request message to the S-CSCF, and the message carries the SDP address information of the user A.

Block S303, the S-CSCF sends the SDP address information of the user A to the CCTF via an out-session Info message.

Block S304, the CCTF sends a request message applying for an SDP terminal of a media anchor point to the CC-IIF.

Block S305, the CC-IIF returns a response message to the CCTF, and the message carries the address information of the SDP terminal of the media anchor point allocated to the user A.

Block S306, the CCTF sends the SDP terminal information allocated to the user A by the CC-IIF to the S-CSCF via a 200 message.

Block S307, the S-CSCF sends the session request message to an AS, and the message carries the SDP terminal information which is allocated to the user A by the CC-IIF.

Block S308, the AS returns the session request message to the S-CSCF, and the message can carry the SDP terminal information which is allocated to the user A by the CC-IIF. In the embodiment, the AS does not process the session request message, that is, the session request message passing through the AS does not change.

Block S309, the S-CSCF sends the session request message to a user B, and the message carries the SDP terminal information which is allocated to the user A by the CC-IIF.

Block S310, the user B returns a 183 temporary response message to the S-CSCF, and the message carries the SDP address information of the user B.

Block S311, the S-CSCF sends the 183 temporary response message to the AS, and the message carries the SDP address information of the user B.

Block S312, the AS returns the 183 temporary response message to the S-CSCF, and similarly the message carries the SDP address information of the user B. In the embodiment, the AS does not process the 183 temporary response message, that is, the 183 temporary response message passing through the AS does not change.

Block S313, the S-CSCF sends the SDP address information of the user B to the CCTF via the out-session Info message.

Block S314, the CCTF sends a request message applying for the SDP terminal to the CC-IIF.

Block S315, the CC-IIF returns the response message to the CCTF, and the message carries the address information of the SDP terminal allocated to the user B.

Block S316, the CCTF sends the SDP terminal information allocated to the user B by the CC-IIF to the S-CSCF via the 200 message.

Block S317, the S-CSCF sends the 183 temporary response message to the P-CSCF, and the message carries the address information of the SDP terminal which is allocated to the user B by the CC-IIF.

Block S318, the P-CSCF sends the 183 temporary response message to the user A, and the message carries the address information of the SDP terminal which is allocated to the user B by the CC-IIF.

Block S319, the user A sends the 200 request message adapted to establish a dialog to the user B.

Block S320, the user B sends the 200 session request message to the S-CSCF.

Block S321, the S-CSCF sends the 200 session request message to the AS.

Block S322, the AS returns the 200 session request message to the S-CSCF.

Block S323, the S-CSCF sends the information adapted to start copying the media to the CCTF via the out-session Info message.

Block S324, the CCTF sends a request message of copying the media to the CC-IIF.

Block S325, the CC-IIF copies the media and sends the copied content to the LIG or LEMF.

Block S326, the CC-IIF returns a message to the CCTF, and the message indicates the media has been copied.

Block S327, the CCTF sends the 200 request message to the S-CSCF.

Block S328, the S-CSCF sends the 200 request message to the P-CSCF.

Block S329, the P-CSCF sends the 200 request message to the user A.

Block S330, the user A sends the response message to the user B.

Block S331, the user A sends an end message to the P-CSCF.

Block S332, the P-CSCF sends the end message to the S-CSCF.

Block S333, the S-CSCF sends the end message to the AS.

Block S334, the AS sends the end message to the S-CSCF.

Block S335, the S-CSCF sends the end message to the user B.

Block S336, the user B sends a 200 end response to the user A.

Obviously, in the embodiment, the interception of the communication content can be implemented on the media anchor point instead of the existing media access equipment, thus implementing centralized interception of the media on the IMS network. Furthermore, the CCTF module and the CC-IIF module are added to the IMS core, thus implementing the centralized interception of the media on the IMS network and ensuring that users accessing the IMS network in various modes can implement the centralized interception of the media on the IMS core. In addition, the added CCTF module and the added CC-IIF module adapted to implement the media stream interception are core network components and belong to the associated components of the IMS core adapted to implement lawful interception, thus ensuring that the adopted private interface is only located in the IMS core, which does not need the extended private interface between the IMS core and the access side equipment. The media information is anchored to the CCTF by the S-CSCF so that media interception of a supplementary service can be implemented when the supplementary service occurs. All services of the IMS network are triggered in the S-CSCF of the home network in a centralized manner, thus ensuring that all users implement the centralized interception of the media streams in the home network. In addition, access control of the user is implemented by the P-CSCF of a roaming network instead of the P-CSCF of the home network when the user roams to another network in the existing technology; therefore, the media interception of the user that roams to another network can not be implemented in the home network. In the embodiment of the present invention, the media interception of the user that roams to another network can also be implemented by implementing the interception of the communication content on a media anchor point.

Figure 4:
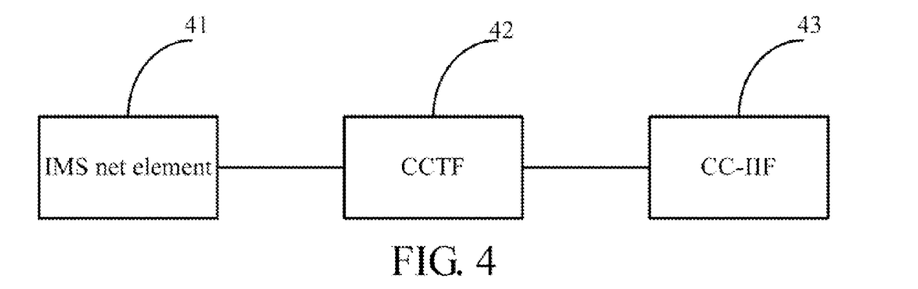
FIG. 4 is a structure diagram of an implementation system of IMS interception provided in the fourth embodiment of the present invention.

An implementation system of IMS interception provided in the fourth embodiment of the present invention is as shown in FIG. 4 and the system includes an IMS net element 41, a content of communication trigger function (CCTF) 42, and a content of communication internal interception function (CC-IIF) 43.

The IMS net element 41 is adapted to send media information of anchored communication parties to the CCTF 42 via a media anchor request message. The IMS net element 41 includes, but is not limited to a serving-call session control function (S-CSCF), an application server (AS), a media gateway control function (MGCF) or a proxy-call session control function (P-CSCF).

The CCTF 42 is adapted to control the CC-IIF 43 to allocate media anchor points to the communication parties, and control the CC-IIF 43 to copy the communication content to complete IMS interception of the communication content when the communication parties communicate through the media anchor points.

The CC-IIF 43 is adapted to allocate the media anchor points to the communication parties and copy the communication content when the communication parties communicate through the media anchor points.

Obviously, in the embodiment, the CCTF module and the CC-IIF module are added to an IMS core, thus implementing centralized interception of the media on the IMS network and ensuring that users accessing the IMS network in various modes can implement the centralized interception of the media on the IMS core without requirement for access side equipment. In addition, the added CCTF module and the added CC-IIF module adapted to implement media stream interception are core network components and belong to the associated components of the IMS core adapted to implement lawful interception, which does not need an extended private interface between the IMS core and the access side equipment.

Figure 5:
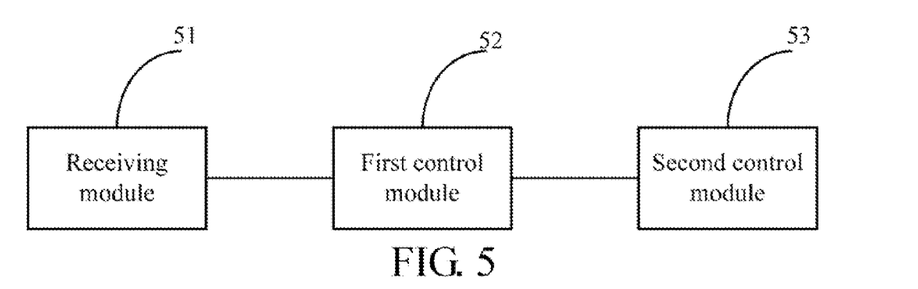
FIG. 5 is a structure diagram of an implementation device of IMS interception provided in the fifth embodiment of the present invention.

An implementation device of IMS interception provided in the fifth embodiment of the present invention is a content of communication trigger function (CCTF) as shown in FIG. 5 and the device includes a receiving module 51, a first control module 52, and a second control module 53.

The receiving module 51 is adapted to receive media information of communication parties which is required to be intercepted and the media information is sent via a media anchor request message from an IMS net element.

The first control module is 52 adapted to control a content of communication internal interception function (CC-IIF) to allocate media anchor points to the communication parties according to the media information received by the receiving module 51.

The second control module 53 is adapted to control the CC-IIF to copy the communication content to complete IMS interception of the communication content when the communication parties control the CC-IIF to allocate the media anchor points to the communication parties through the first control module 52.

Obviously, in the embodiment, the CCTF module and the CC-IIF module are added to an IMS core, thus implementing centralized interception of the media on the IMS network and ensuring that users accessing the IMS network in various modes can implement the centralized interception of the media on the IMS core without requirement for access side equipment. In addition, the added CCTF module and the added CC-IIF module adapted to implement media stream interception are core network components and belong to the associated components of the IMS core adapted to implement lawful interception, which does not need an extended private interface between the IMS core and the access side equipment.

Figure 6:
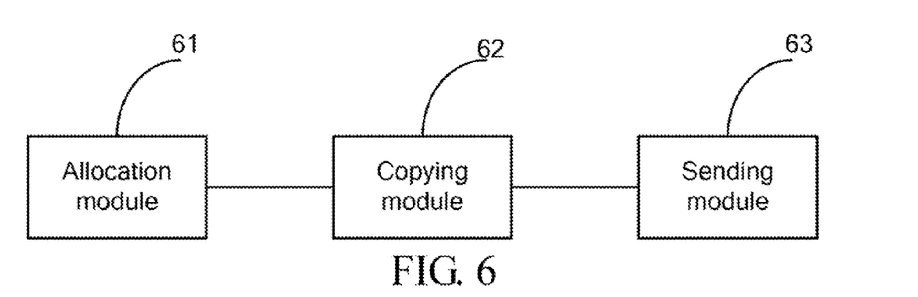
FIG. 6 is a structure diagram of an implementation device of IMS interception provided in the sixth embodiment of the present invention.

An implementation device of IMS interception provided in the sixth embodiment of the present invention is a content of communication internal interception function (CC-IIF) as shown in FIG. 6 and the device includes an allocation module 61, a copying module 62, and a sending module 63.

The allocation module 61 is adapted to allocate media anchor points to communication parties.

The copying module 62 is adapted to copy communication content to complete interception of the communication content when the communication parties communicate through the media anchor points allocated by the allocation module 61.

The sending module 63 is adapted to send the communication content copied by the copying module 62 to an interception center which includes, but is not limited to an LIG or an LEMF. Sending the communication content to an interception center includes, but is not limited to: sending the communication content to the interception center in a manner of directly copying the communication content on a connecting circuit through a narrow band circuit connection; sending the communication content to the interception center in a manner of initiating a narrow band call to the interception center through a narrow band circuit connection; sending the communication content to the interception center in a manner of directly copying the communication content on an IP connection through the IP connection; and sending the communication content to the interception center in a manner of initiating an SIP call on the IP connection through the IP connection.

Obviously, in the embodiment, the CCTF module and the CC-IIF module are added to an IMS core, thus implementing centralized interception of the media on the IMS network and ensuring that users accessing the IMS network in various modes can implement the centralized interception of the media on the IMS core. In addition, the added CCTF module and the added CC-IIF module adapted to implement media stream interception are core network components and belong to the associated components adapted to implement lawful interception of the IMS core, which does not need an extended private interface between the IMS core and access side equipment. The media information is anchored to the CCTF by an IMS net element so that media interception of a supplementary service can be implemented when the supplementary service occurs. All services of the IMS network are triggered in the S-CSCF of a home network, thus ensuring that all users implement the centralized interception of media streams in the home network. Furthermore, the media interception of a user that roams to another network can also be implemented by implementing the interception of the communication content on the media anchor point.

From the description of the embodiments above, those skilled in the art can clearly know that the present invention can be implemented by hardware or software with a necessary general-purpose hardware platform. On the basis of the understanding, the technical scheme of the present invention can be embodied in form of a software product which can be stored in a non-volatile storage media (a CD-ROM, a USB disc, a mobile hard disc, etc.) and includes multiple commands to instruct computer equipment (a PC, a server or a network equipment, etc.) to execute methods described in various embodiments of the present invention.

The above are preferred embodiments of the present invention, and it must be pointed out that various improvements and modifications can be made herein without departing from the principle of the present invention to those ordinary skilled in the art, and the improvements and modifications should be merged in the protection scope of the present invention.

What is claimed is:

1. An implementation method of IP multimedia subsystem (IMS) interception, comprising:
   receiving, by a content of communication trigger function (CCTF) having a processor, media information of the communication parties which is required to be intercepted and the media information is sent via a media anchor request message from an IMS net element, wherein the media anchor request message comprises a session-irrelative message, the session-irrelative message comprises a session-irrelative SIP message or a session-irrelative non-SIP message, the session-irrelative SIP message comprises an INFO message or a MESSAGE message, and the session-irrelative non-SIP message comprises a Diameter message;
   allocating, by the CCTF, media anchor points to the communication parties;
   sending, by the CCTF, the media anchor points allocated to the communication parties to the IMS net element via a media anchor result response message, the media anchor result response message comprises the session-irrelative message; and
   copying, by the CCTF, communication content to complete interception of the communication content when the communication parties communicate through the media anchor points.

2. The method according to claim 1, wherein the allocating, by the CCTF, media anchor points to communication parties comprises:
   controlling, by the CCTF, a content of communication internal interception function (CC-IIF) to allocate the media anchor points to the communication parties; and
   the copying, by the CCTF, communication content comprises:
   controlling, by the CCTF, the CC-IIF to copy the communication content.

3. The method according to claim 1, wherein the method further comprises replacing the media information of the communication parties which is required to be intercepted with media information of the media anchor points which are allocated to the communication parties.

4. The method according to claim 1, wherein the IMS net element comprises at least one of:
   a serving-call session control function (S-CSCF);
   an application server (AS);
   a media gateway control function (MGCF); and
   a proxy-call session control function (P-CSCF).

5. The method according to claim 1, wherein the communication content comprises at least one of voice communication content, fax content, MODEM content, video communication content and data interaction content.

6. The method according to claim 1, wherein after copying communication content, the method further comprises: sending, by the CC-IIF, the communication content to an interception center; and the sending the communication content to an interception center comprises at least one of:
   sending the communication content to the interception center in a manner of copying the communication content on a connecting circuit through a narrow band circuit connection;
   sending the communication content to the interception center in a manner of initiating a narrow band call to the interception center through a narrow band circuit connection;
   sending the communication content to the interception center in a manner of copying the communication content on an IP connection through the IP connection; and
   sending the communication content to the interception center in a manner of initiating an SIP call on an IP connection through the IP connection.

7. An implementation system of IP multimedia subsystem (IMS) interception, comprising an IMS net element, a content of communication trigger function (CCTF) and a content of communication internal interception function (CC-IIF), wherein the IMS net element is adapted to send media information of the communication parties anchored to the CCTF via a media anchor request message which comprises a session-irrelative message, the session-irrelative message comprises a session-irrelative SIP message or a session-irrelative non-SIP message, the session-irrelative SIP message comprises an INFO message or a MESSAGE message, and the session-irrelative non-SIP message comprises a Diameter message;

the CCTF is adapted to control the CC-IIF to allocate media anchor points to communication parties, and control the CC-IIF to copy the communication content to complete interception of the communication content when the communication parties communicate through the media anchor points; and the CC-IIF is adapted to allocate the media anchor points to the communication parties and copy the communication content when the communication parties communicate through the media anchor points;

wherein the CCTF is further adapted to send the media anchor points allocated to the communication parties to the IMS net element via a media anchor result response message, the media anchor result response message comprises the session-irrelative message.

8. The system according to claim 7, wherein the CCTF which is a functional module for an IMS network to implement a media interception, is an independent net element or is jointly stored on a media gateway control function (MGCF) or a serving-CSCF (S-CSCF).

9. The system according to claim 7, wherein the IMS net element is further adapted to replace an original session description protocol (SDP) address according to the media anchor points which are allocated to the communication parties by the CC-IIF.

10. An implementation device of IP multimedia subsystem (IMS) interception, comprising:

a receiving module, adapted to receive media information of the communication parties which is required to be intercepted and the media information is sent via a media anchor request message from an IMS net element, wherein the media anchor request message comprises a session-irrelative message, the session-irrelative message comprises a session-irrelative SIP message or a session-irrelative non-SIP message, the session-irrelative SIP message comprises an INFO message or a MESSAGE message, and the session-irrelative non-SIP message comprises a Diameter message;

a first control module, adapted to control a content of communication internal interception function (CC-IIF) to allocate media anchor points to communication parties; and a second control module, adapted to control the CC-IIF to copy communication content when the communication parties communicate through the media anchor points to complete interception of the communication content.

* * * * *